(12) United States Patent
Li et al.

(10) Patent No.: US 9,245,125 B2
(45) Date of Patent: Jan. 26, 2016

(54) DULEAK: A SCALABLE APP ENGINE FOR HIGH-IMPACT PRIVACY LEAKS

(71) Applicant: NEC Laboratories America, Inc., Princeton, NJ (US)

(72) Inventors: Zhichun Li, Plainsboro, NJ (US);
Zhenyu Wu, Plainsboro, NJ (US);
Zhiyun Qian, Franklin Park, NJ (US);
Guofei Jiang, Princeton, NJ (US);
Kangjie Lu, Princeton, NJ (US);
Vasileios Kemerlis, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/552,470

(22) Filed: Nov. 24, 2014

(65) Prior Publication Data

US 2015/0242635 A1 Aug. 27, 2015

Related U.S. Application Data

(60) Provisional application No. 61/945,239, filed on Feb. 27, 2014.

(51) Int. Cl.
*G06F 12/16* (2006.01)
*G06F 21/57* (2013.01)

(52) U.S. Cl.
CPC ........ *G06F 21/577* (2013.01); *G06F 2221/033* (2013.01)

(58) Field of Classification Search
CPC ............ G06F 2221/033; G06F 21/55–21/558; G06F 21/577
See application file for complete search history.

(56) References Cited

U.S. PATENT DOCUMENTS

| | | | | |
|---|---|---|---|---|
| 2007/0101433 | A1* | 5/2007 | Louch ................... | G06F 21/552 726/25 |
| 2015/0161393 | A1* | 6/2015 | Pistoia ................. | G06F 21/577 726/25 |

OTHER PUBLICATIONS

Wang et al. (2013). Jekyll on ios: when benign apps become evil. In Proceedings of the 22nd USENIX conference on Security, Sec'13, pp. 559-572, Berkeley, CA, USA, 2013. USENIX Association.*

Yang et al. (2012). LeakMiner: Detect Information Leakage on Android with Static Taint Analysis, Proceedings of the 2012 Third World Congress on Software Engineering, p. 101-104, Nov. 6-8, 2012.*

* cited by examiner

*Primary Examiner* — Brian Shaw
(74) *Attorney, Agent, or Firm* — Joseph Kolodka (57) ABSTRACT

Systems and methods are disclosed for protecting privacy in an application software (app) by detecting application repacking; detecting application tainting, including: detecting descrying information leakage; detecting vulnerability espial; and detecting a privacy leak.

10 Claims, 6 Drawing Sheets

DULEAK: A SCALABLE APP ENGINE FOR HIGH-IMPACT PRIVACY LEAKS

This application claims priority to Provisional Application 61/945,239 filed Feb. 27, 2014, the content of which is incorporated by reference.

BACKGROUND

Smartphones have become ubiquitous, and as mobile users continue to rely on apps for personalized services or business mobility, app are increasingly entrusted with more and more private and sensitive information. Meanwhile, a large number of apps without functional dependency on user data also use (monetize on) user privacy to varying degrees, ranging from typically benign cases like targeted advertising to ill-intended ones like identity thefts. As a result, mobile users on one hand are largely in favor of personalized services, but on the other hand, become more and more concerned about apps abusing their data. This issue is worsened by the current lack of tools or methods that can inform users of potentially harmful privacy leaks in their apps without distracting or confusing users with apps' legitimate privacy disclosures.

Mainstream smartphone OSs, such as Android and iOS, provide basic protection on user sensitive information, such as the permission system, which enforces coarse-grained and static access control on sensitive resources as per users' explicit consent. However, success of such systems largely relies on users' common awareness of, and sometimes deep understanding on, the privacy impacts of apps' advertised features, which often turns out to be unrealistic to assume in practice. Moreover, these systems offer little clues and help to users when soliciting their consent.

Serious concerns have been raised about stealthy disclosures of private user data in smartphone apps, and recent research efforts in mobile security have studied various types of detection of privacy disclosures. Existing approaches are not effective in informing users and security analysts about potential privacy leakage threats. This is because these methods largely fail to: 1) provide highly accurate and inclusive detection of privacy disclosures; 2) filter out the legitimate privacy disclosures that usually dominate the detection results and in turn obscure the true threats. Most existing works only focus on privacy discharge detection. Those approaches can tell you App X has sent your privacy sensitive data Z to location Y. However, many apps have to use user privacy data for their important features. For example, you have to send your GPS location to Google Maps.

The growth of smartphone application (i.e., app) markets have been truly astonishing, as reflected in the ever increasing user population and the constantly enriching offering of apps that virtually satisfy all forms of digital needs of the users. As apps are used for more and more private and privileged tasks by the users, concerns are also rising about the consequences of failure to protect or respect user's privacy (i.e., transferring it to remote entities or publicizing it). As a result, many approaches have been proposed to automatically uncover privacy disclosures in Android Apps, falling into two major categories: static control and data flow analysis, and dynamic data flow tracking.

Although previous works successfully revealed the pervasiveness of privacy disclosures in apps and made significant progress towards the automatic detection of privacy disclosures, two major shortcomings remain to be addressed: (1) relatively low coverage of data-flows; (2) incapability of judging the legitimacy of detected flows. The first shortcoming prevents current data-flow analysis from identifying complex data-flows, such as conditional or joint flows, which are frequently seen in Android apps. Conditional flows are unique to Android apps and caused by generic system APIs that can access a variety of data sources and sinks, including sensitive ones (e.g., contacts and sensitive content providers), which are determined solely by the runtime parameters (e.g., URIs and flags). Joint flows consist of two or more sub-flows, implicitly connected outside of app code (e.g., inside database, file system, or OS), which may form a channel at runtime and disclose private data. The second shortcoming often results in inflated detection results containing too many false alerts (e.g., benign or functional privacy disclosures). These alerts usually do not represent violations of user privacy, and therefore, distract or even overwhelm human users and analysts when interpreting detection results. Our study shows that more than 67% app privacy disclosures found using conventional methods are in fact legitimate (i.e., necessary to apps' core functionalities). For example, navigation apps need to report user's current location to remote servers for up-to-date maps and real-time road conditions. From now on, we use the term privacy disclosure to generally describe apps' actions that propagate private data to external entities. We reserve the term privacy leak only for describing a privacy disclosure that cannot be intuitively justified by the app's intended functionaries.

SUMMARY

Systems and methods are disclosed for protecting privacy in an application software (app) by detecting application repacking; detecting application tainting, including: detecting descrying information leakage; detecting vulnerability espial; and detecting a privacy leak.

Advantages of the system may include one or more of the following. Our static analysis approach is more accurate than existing works by modelling the Android OS more precisely. The unique peer comparison approach finds similar apps for App X, and then try to see whether App X discharges any sensitive data that all the other apps with similar functionalities do not. In this way, we can quickly identify the real high-impact privacy leaks. The system can detect high-impact privacy leaks inside the apps and protect user privacy. In this work, we propose to detect real high-impact privacy leaks that do not really benefit user much. In comparison, existing solution only identifying the privacy discharges and most of them are legitimate, which is not interesting for the users. We can identify the real high-impact privacy leakages with high accuracy. We implemented AAPL and evaluated it over 40,456 apps. The results show that, on average, AAPL achieves an accuracy of 88.68%. For particular disclosures, e.g., contacts, the accuracy is up to 94.64%. Using AAPL, we successfully revealed a collection of apps that cause privacy leaks

BRIEF DESCRIPTION OF THE DRAWINGS

FIG. 3A shows an exemplary system to detect privacy leaks while

FIG. 4 shows in more details the privacy leak detection, while

DESCRIPTION

Figure 1A:
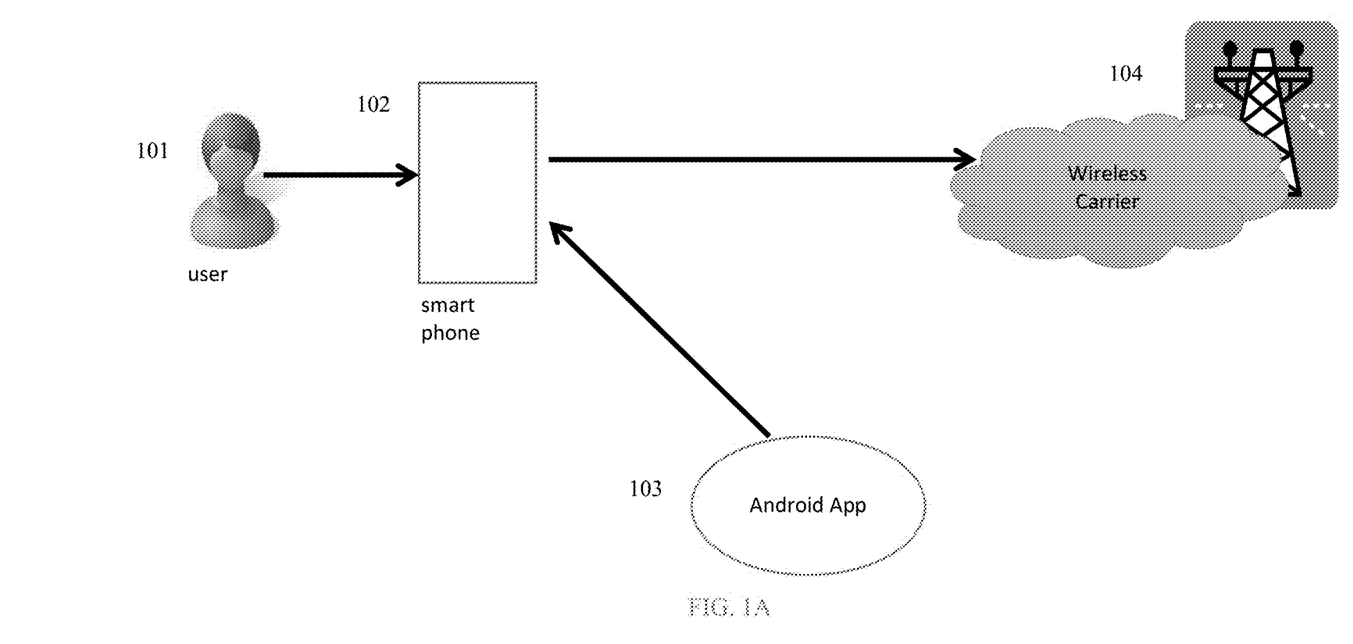
FIG. 1A shows an exemplary smart phone environment while FIG. 1B compares AAPL functions with existing solutions.

FIG. 1 shows an exemplary smart phone environment. In FIG. 1, a user 101 uses a smart phone 102 loaded with applications (apps) 103. The phone 102 communicates data through a wireless carrier 104.

To help users make more informed decisions, many existing privacy disclosure detection systems were built to reveal apps' behaviors that propagate sensitive data (i.e., source) to a sensitive channel (i.e., sink). These systems perform either static or dynamic data-flow analysis on apps. Dynamic approaches, such as TaintDroid, feature low false positives, while the static detection approaches, such as CHEX, achieve high coverage and scalability. Works following either approaches have demonstrated effective detection of privacy disclosures, and their results show that about 20%-40% of all apps in Google Play market disclose user privacy for different purposes and through different channels.

However, simply reporting the existence of privacy disclosures may not be meaningful enough to app users or security analysts. Even if the privacy disclosure of an app is detected and presented users, the burden of comprehending each privacy disclosure of an app and deciding its negative privacy impact can be heavy to average users. Let us consider a common privacy disclosure through which location is sent to the Internet. Current detection systems alert users about such privacy disclosures whenever they are detected in an app, regardless of if the app's core functionality depend on them. Therefore, no matter analyzing a benign navigation app or a calculator app with a 3rd-party library aggressively tracking users, current detection systems alert users with the same type of reports, usually in a large amount, that indicate potential privacy violations.

Figure 2A:
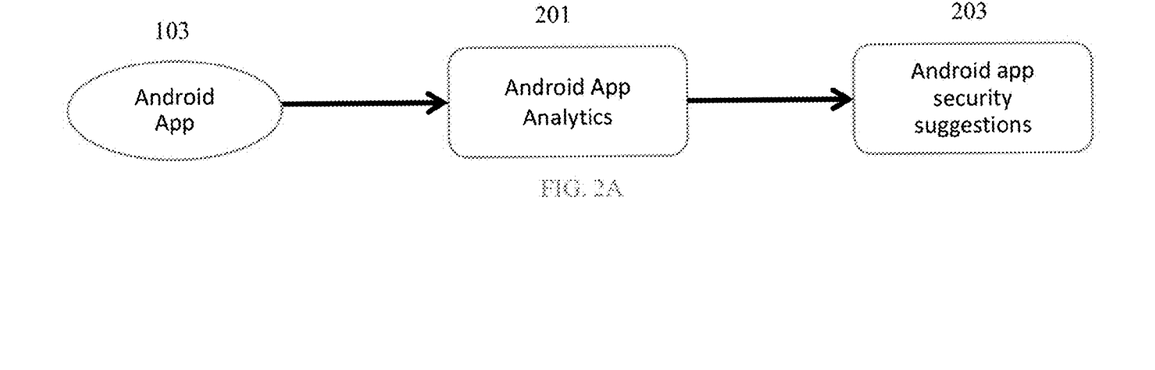
FIG. 2A shows an exemplary application security system.

FIG. 2A shows an exemplary application security system to address the foregoing issues. An application 103 is received and analyzed by an App Analytics module 201 and after analysis, the analytics 201 provides an app security suggestions module 203.

Figure 3A:
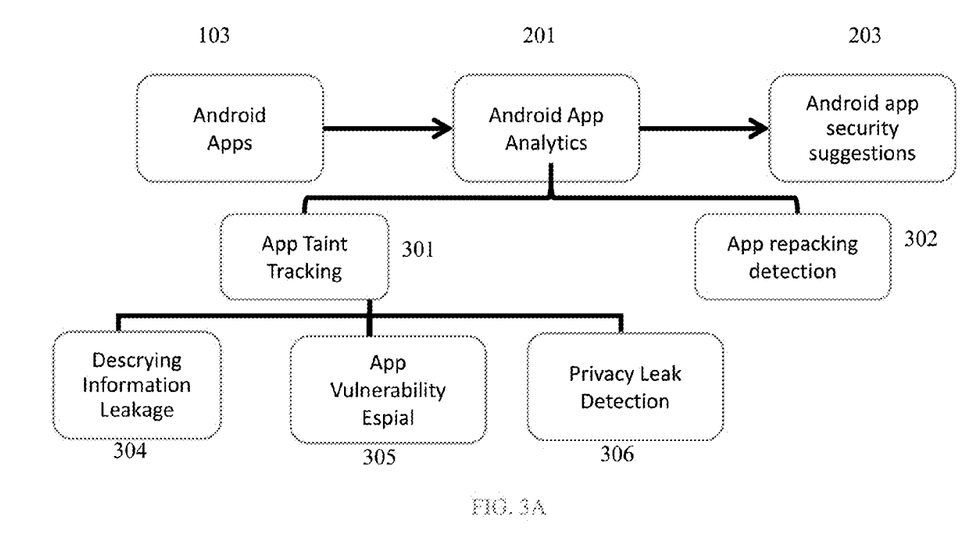

FIG. 3 shows an exemplary system to detect privacy leaks. A plurality of applications 103 are presented to an analytics module 201 that generates security suggestions 204. The analytics module 201 in turn checks for taint tracking in 301 and app repacking detection in 302. The taint tracking 301 in turn checks for descrying information leakage 304, app vulnerability espial 305, and privacy leak detection 306.

Figure 4:
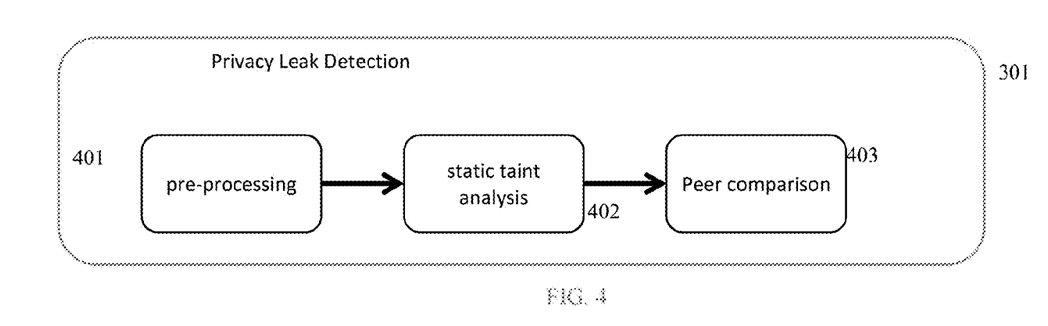
Figure 5:
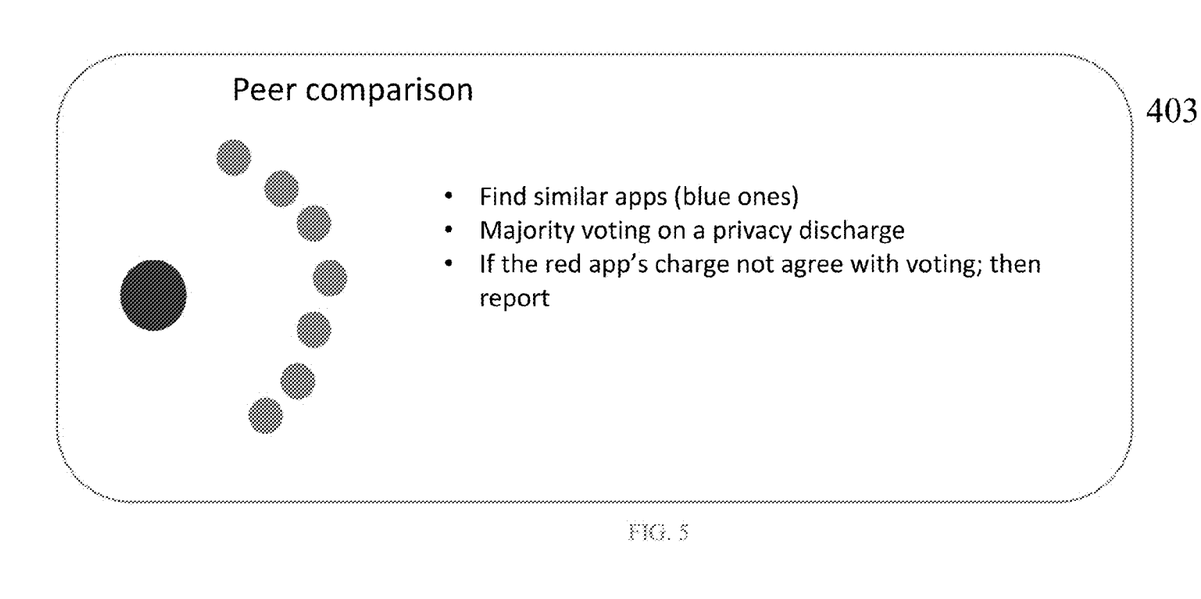
FIG. 5 details the peer comparison.

FIG. 4 shows in more details the privacy leak detection 301. This is done with pre-processing the app in 401, analyzing for static taint in 402, and peer comparison 403. The peer comparison 403 is expanded in FIG. 5 and this process finds similar apps and request voting on a privacy discharge. If the current app to be peer compared does not agree with the voting, then the process 403 reports a potential violation of privacy.

Figure 6:
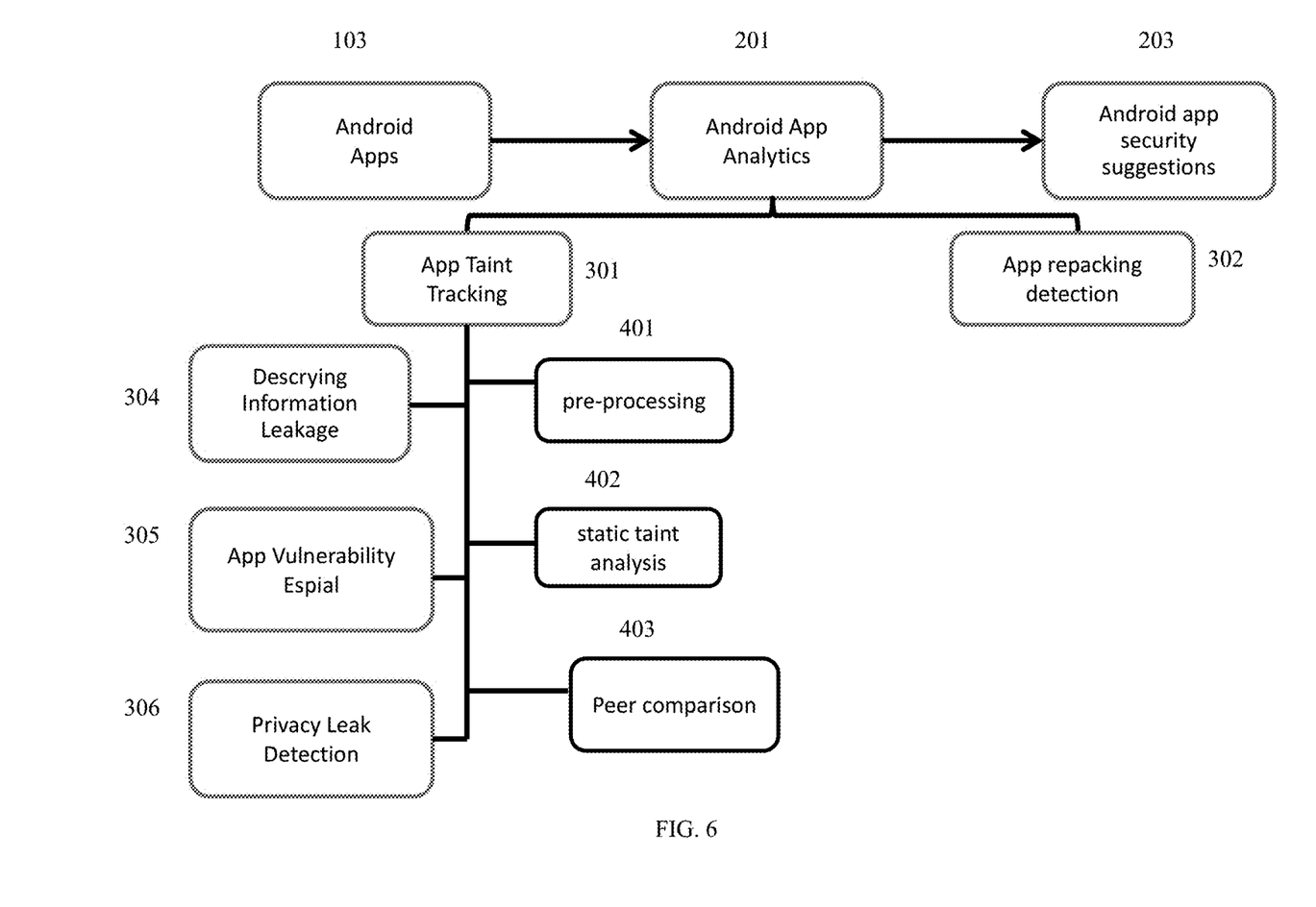
FIG. 6 shows another exemplary system to detect privacy leaks.

FIG. 6 shows a more detailed implementation of FIG. 3, where the app taint tracking module 301 includes the individual modules of the privacy leak detector 306 including preprocessor 401, static taint analyzer 402, and peer comparator 403.

The system provides a solution that can automatically infer if a given privacy disclosure is legitimate or not, i.e., whether it is likely required by an app's core functionalities. Considering the large amount of competing apps with similar functionalities, we form the hypothesis that one can derive the legitimate privacy disclosures required by the core functionalities across a collection of similar app. On the other hand, privacy disclosures that are uncommonly used by a collection of similar apps would naturally stand out, and those privacy disclosures are very likely unrelated to the advertised core functionalities of the app. Based on this hypothesis, we could build a system which automatically screens all privacy disclosures and automatically filters out those which are likely related to app's core functionalities, and only flags the highly suspicious privacy disclosures.

To properly implement and verify our hypothesis, we face three challenges: 1) We need some way to find functionally similar apps. As will be described later, we mostly leverage existing app recommendation systems such the one provided by Google Play, and employ a natural language processing (NLP) technique called semantic similarity [30] to further purify similar apps. 2) We need an highly accurate analysis system that can capture privacy disclosure flows accommodating with the special Android programming paradigm. We choose static analysis since it allows us to discover more complete privacy disclosure flows with high performance. 3) We need an automated approach to differentiate the highly suspicious privacy disclosures from legitimate ones.

Figure 1B:
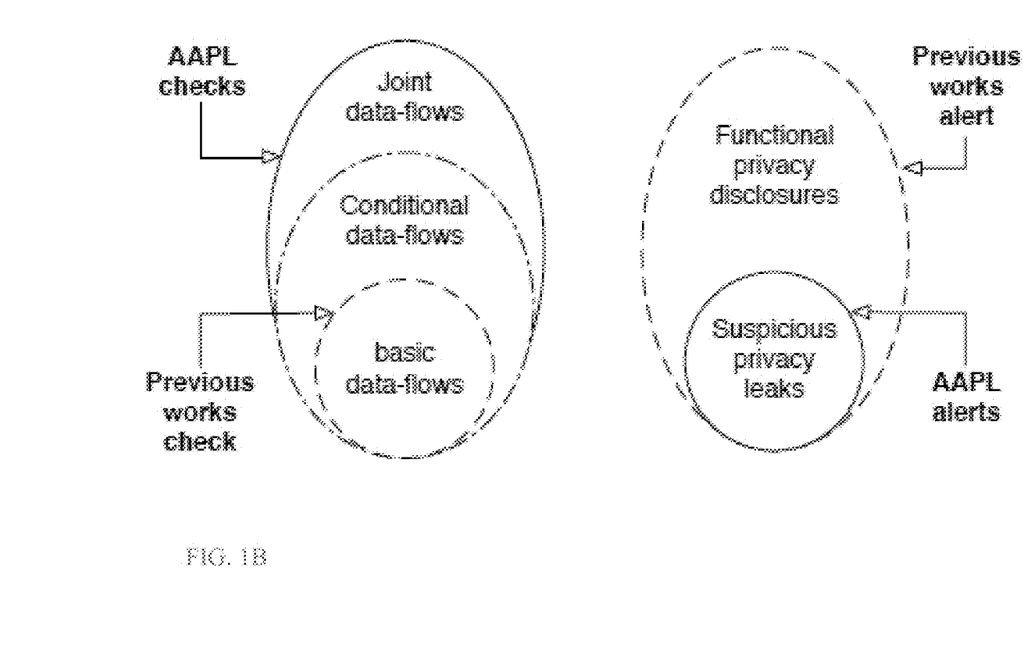

AAPL (Analysis of App Privacy Leak, pronounced as "Apple") has been developed to address both of the shortcomings discussed above. As the left part of FIG. 1B shows, AAPL improves the state-of-art data-flow analysis with the capability of identifying and checking the complex flows. These complex flows constitute several types of common privacy disclosures in Android apps. Therefore, including these flows significantly increases the detection rate of privacy disclosures. Furthermore, unlike previous works, which report all detectable privacy disclosure, AAPL is capable of judging the legitimacy of privacy disclosures and only alerting privacy leaks, which are the true concerns of app users and security analysts.

AAPL achieves a highly accurate detection by introducing three new techniques to existing static data-flow analysis of Android apps. They are: opportunistic constant evaluation, object origin inference, and joint flow tracking. The first two techniques overcome the open research challenge of correctly recognizing conditional sources and sinks of sensitive data and identifying the related data-flows. The third technique allows AAPL to form joint data-flows from seemingly disconnected data-flows that are connected by external code during runtime. These improvements better adapt existing static analysis techniques to the unique programming paradigms of Android apps and therefore allow AAPL to detect the data-flows that are invisible to existing methods.

Once the improved data-flows analysis has detected the privacy disclosures, AAPL continues to discover privacy leaks using a novel peer voting mechanism. This mechanism is inspired by the fact that applications of the same or similar functionality (i.e., peer apps) should exhibit similar privacy consumption behaviors, and therefore, incur a similar set of privacy disclosures. The peer voting mechanism determines the legitimacy of a particular privacy disclosure detected in an app (i.e., primary app) by consulting the privacy disclosure profiles of its peer apps. If the privacy disclosure is common among the peer apps (i.e., majority of the peers vote for it), it is considered to be necessary to the primary app's main functionalities. Otherwise, the privacy disclosure is likely to be caused by dispensable or unexpected features of the primary app, and therefore, represents a high risk of privacy leak. The peer app collection process is fairly straightforward. For a primary app, AAPL queries the existing app recommendation systems. Such systems, either an integral feature of app stores or a standalone service by 3rd parties, returns a list of apps that are functionally similar or related to the primary app. However, it is not uncommon to see apps of different functionalities returned on the same list by these systems. This is because apps are considered as related not only when they're functionally similar but also when they are frequently installed or used together (e.g., a restaurant review app and a movie review app). AAPL filters out these minor noises by applying basic semantic similarity analysis on app descriptions and removing apps whose descriptions have long semantical distance from the descriptions of other peers.

We evaluated AAPL using 2,777 popular apps as primary apps, which led to 37,679 peer apps in total. We randomly chose 417 primary apps for in-depth evaluations, which involve 532 unique privacy disclosures. AAPL can achieve a 88.68% accuracy with a false positive rate of 10.74% and a false negative rate of 12.50%. For some specific leaks concerning contacts and etc., AAPL can achieve an even better accuracy of 94.64% with a false positive rate of 4.35% and a false negative rate of 9.92%.

AAPL is designed to be practical and efficient so that it can be operated by 1) large-scale app market providers, to screen their hosted apps; 2) users, to avoid apps that do not respect their privacy; 3) developers, to understand the privacy issues of the third-party libraries they use. AAPL is a general privacy leak flow detection system that can be taken advantage of by multiple principles. First, AAPL could be taken as an efficient detection system for market providers to detect the apps with potential suspicious privacy disclosures. To further determine whether the detected suspicious privacy disclosures are real privacy leaks, market providers can challenge developers to justify why and how privacy disclosures are used in the app's which functionality. Failure to justify the privacy disclosures might result in rejection of the app from the markets. Without our system, simply challenging every privacy disclosure is unacceptable, as 1) most privacy disclosures are actually legitimate, and it will annoy most developers; 2) verifying the justifications of large-scale apps is resource-consuming for market providers. AAPL aims to detect highly suspicious privacy disclosures, and only a small portion of AAPL detection results are false positives that mainly caused by special functionalities of the app, e.g., messaging in the photo editor app. Challenging the developers of such apps is acceptable. Second, AAPL can help privacy-concerned users identify the apps with suspicious privacy disclosures. Users usually do not know why and how the privacy disclosures are used in the app, simply reporting the privacy disclosures to users provides limited help to understanding how well the app respects users' privacy. AAPL provides an important metric for users to understand how likely the privacy disclosure is a privacy leak, and the suspicious privacy leaks when comparing with similar apps. Third, developers can make use of AAPL to check whether their apps have suspicious privacy disclosures. If the suspicious privacy disclosure is caused by third-party libraries, the developer can choose an alternative library to avoid suspicious privacy disclosures. On the other hand, if the suspicious privacy disclosure is necessary to the benign code written by the developer, the developer can explicitly justify the necessary usage of the privacy disclosure in the app description.

AAPL is a suspicious privacy disclosure detection system, designed to uncover privacy leakage data flows in a given Android app. Instead of focusing on malicious privacy leakages that deliberately evade detection, AAPL targets efficient and scalable screening of a large number of apps. Most of the apps in the app markets are legitimate, whose developers try to monetize by gaining user popularity, even through some of them might be a little bit aggressive on consuming user privacy in exchange of revenue. Malware can be detected by existing works [2, 14, 36], which is out of scope of this paper. Specifically, AAPL detects unobfuscated privacy disclosures that could not be justified by the general functionalities of the app. In addition, while AAPL should generally have a high accuracy, it does not guarantee zero false positive or false negative as most other privacy disclosure detection systems. AAPL aims to have low false positives, so that the security analysts can filter them out, and try the best to have a good coverage as demonstrated through evaluation.

AAPL aims to address the challenging problem of automatically differentiating privacy leaks from legitimate privacy disclosures with a high accuracy. AAPL achieves this goal by proposing two major components: 1) Privacy Disclosure Analysis Module that detects all potential privacy disclosures in Android app, including legitimate privacy disclosures and privacy leaks, and 2) Privacy Leak Detection Module that differentiates privacy leaks from legitimate privacy disclosures using the novel peer voting mechanism. Here, we first present the workflow of AAPL. Then, we describe the detailed design of the two components.

Figure 3B:
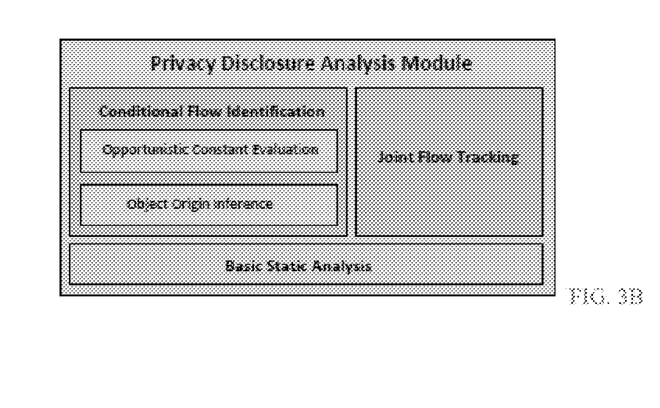
FIG. 3B shows a structure of the privacy disclosure analysis module.

The workflow of AAPL is shown in FIG. 3B. Given a target app to be analyzed, i.e., the primary app, we first identify the list of functionally similar peer apps based on the recommendations from the market providers (e.g., the Similar Apps list and Users Also Installed list from Google Play). Some noisy peer apps (that are not really functionally similar) are filtered by same-category policy and a NLP technique called semantic similarity [30]. After that, we build a highly accurate static privacy disclosure analysis module to detect all potential privacy disclosures in both primary app and its peer apps. We design several techniques that significantly improve the privacy disclosures detection accuracy for the programming paradigms of Android programs, such as opportunistic constant evaluation, object origin inference and joint flow tracking etc. Finally, we use a novel peer app voting mechanism to automatically differentiate the legitimate privacy disclosure flows from the suspicious ones, which are likely to cause privacy leaks. AAPL does not depend on heavy domain knowledge or specific program execution context, and thus it greatly reduces the amount of human efforts.

```
1    public void sendContactsToServer() throws IOException
2    {
3        Uri uri=ContactsContract.Contacts.CONTENT_URI;
4        //Require constant evaluation for uri
5        Cursor cur=getContentResolver().query(uri,null, null,
                null, null);
6        int. contactsCounter = cur.getCount();
7        //Require false positive filtering,
8        //as count is not sensitive
9        sendDataToServer(String.valueOf (contactsCounter)};
10       if (contactsCounter == 0) return;
11       while (cur.moveToNext.()} {
12           int idClsIdx = cur.getColumnIndex ("...id");
13           String id = cur.getString(idClnIdx) ;
14           StringBuilder data = new StringBuilder(id);
15           int nameClsIdx = cur.getColumnIndex("display_name");
16           //Require joint flow tracking
17           String rawName = cur.getString(nameClnIdx);
18           File rawFile = new File(getFilesDir(), "filename");
19           writeDataToLocalFile(rawFile, rawName);
20           ...
21           File newFile = new File(getFilesDir(), "filename");
22           String newName = readDataFromLocalFile(newFile);
23           //Require fine-grained propagation policy for
24           //StringBuilder.append()
25           data.append(newName);
26           sendDataToServer(data.toString()};
27       }
28   }
29
30   public void sendDataToServer(String Data) throws
             IOException
```

```
31    {
32        URL url=new URL ("http://urlsample");
33        HttpsURLConnection conn=(HttpsURLConnection)
              url.openConnection();
34        OutputStream output=conn.getOutputStream();
35        //Require object origin inference for output object
36        output.write(Data);
37    }
```

Figure 2B:
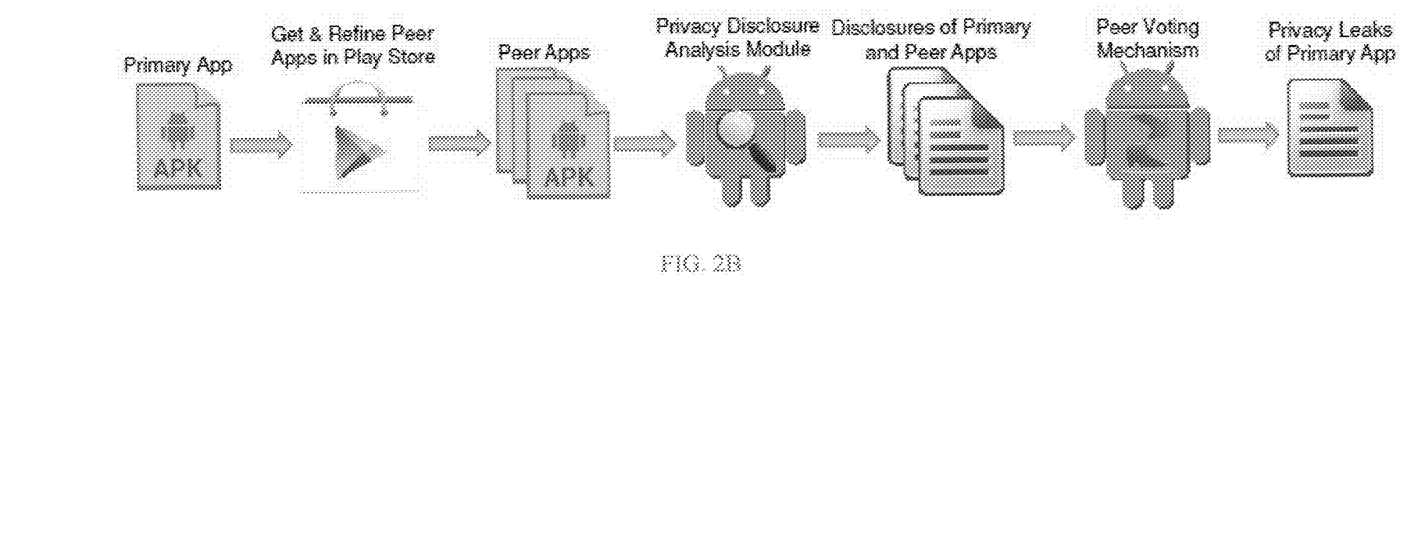
FIG. 2B shows the workflow of AAPL.

The privacy disclosure analysis module of AAPL is responsible for generating privacy disclosure flow reports. Specifically, given an Android app, this module conducts highly accurate static program analysis to identify all potential privacy disclosure flows in this app, including both legitimate privacy disclosures and privacy leaks. The privacy disclosure analysis module is essentially a static taint tracking system. It detects all data-flows from the predefined sensitive data, i.e., sources, to the predefined channels, i.e., sinks. The privacy disclosure is modelled by data-flows connecting sources to sinks. In AAPL, we employ similar techniques from existing approaches for detecting entry points, building system dependence graph (SDG), and permutating and connecting the partial data-flows found by different entry points. Besides the wisdom from previous works, we have designed and implemented a set of enhancements to further boost the accuracy of our detection module, including conditional flow identification through opportunistic constant evaluation and object origin inference, and joint flow tracking as shown in FIG. 2B. With those improvements, we have achieved 31% more privacy disclosures detection rate while reducing the false positives 5 times. Here, we first show the motivations of our improvements, and then elaborate how these improvements are designed to address limitations of existing static analysis systems for Android.

To identify the conditional sources/sinks that are dependent on the values of their parameters (e.g., sensitivity of ContentResolver.query( ) depends on the value of its parameter uri), an intuitive solution is to statically collect a set of all possible values of the parameter in question and check if the set contains any interesting value that indicates a sensitive source/sink, e.g., parameter uri in ContentResolver.query( ) points to content://contacts. We have devised a new technique, namely opportunistic constant evaluation, inspired by traditional constant folding technique. Constant folding (or constant propagation) is a standard compiler technique[5] that simplifies constant expressions at compile time. As an example, consider the following statement: String str="foo"+" "+"bar". Without the constant folding optimization this statement would resolve to a series of method invocations from the String class, e.g., String str="foo".concat(" ".concat("bar")). If the compiler has constant folding enabled, it will directly initialize str with the (string) constant "foo bar". Note that, such folding is performed only if it can be proved to be safe. For instance, in the snippet shown in example code, the compiler will not constify the argument str of println( ) since there are more than one data paths that define str with a (different) value (the exact value of str depends on the switch condition, which in turn may depend on dynamic, run time computation). Yet, if the compiler identifies that all cases apart "default" are dead code, it will replace println(str) with println("dead"), since str remains constant across all control and data paths leading to the println( ) statement.

Differently, opportunistic constant evaluation is doing the folding in an opposite way. Its main idea is to statically compute the set of all possible values of specific parameters along all program paths passed to the conditional sources/sinks, e.g., generic content resolvers. and decide the sensitivity of the source/sink based on the set.

Let us consider again ContentResolver.query( ). The actual content accessed with this call depends on the value of the first parameter (i.e., uri) of query( ). If uri="content://contacts/ . . . ", then contact information will be accessed. Likewise, if uri="content://mms-sms/ . . . ", MMS and SMS messages will be accessed. Assuming that both contact information and MMS/SMS content is sensitive, we should consider ContentResolver.query( ) as a sensitive data source in case uri is one of the above, but we should ignore it if, say, uri is used to access app-specific (insensitive) data. Although uri can be computed dynamically, at run time, the Android framework provides a set of constant schemas that are typically used as templates, by app authors, when requesting access to content. For instance, Contacts.CONTENT_URI is a Uri object (declared as public static final) that uses the content schema to request access to contact information. Similarly, Browser.SEARCHES_URI is used for the browser search history. Our intuition is that, in most cases, the uri parameter will either be constant at the point of use or constructed progressively (perhaps with the help of run time information) using URI objects from the Android framework (i.e., start with a constant accessor, like Contacts.CONTENT_URI, and further specialize it by appending a variable suffix).

To facilitate conditional tracking, we first need to augment our list of predefined sources/sinks, with information regarding the parameter values of generic data and OS object accessors. We have manually analyzed the Android framework and identified about 600 cases that signify whether we should track a generic source/sink or not. For example, ContentResolver.query( ) is conditionally tracked in 48 cases, e.g., when uri begins with the prefix content://call_log, content://mms, content://contacts, etc.

Armed with that information, we apply constant folding opportunistically, in an inter-procedural manner, and collect as many constant values for the interesting parameters of conditional sources/sinks as possible. Notice that though traditional constant folding algorithms aim for safety (recall that str will not be constified in the general case), we strive to be as complete as possible. Hence, for the code snippet, AAPL returns the following as possible values for str: {"dead", "deadbeef", "deadcaffe"}. To achieve that, leveraging system dependence graph (SDG), we build a data-dependency only graph (DDG). We first compute a data-dependence sub-graph of the source/sink in question. Such a sub-graph is a DDG rooted with the conditional parameter(s) of the respective source/sink (taken from our augmented list). Every node of that sub-DDG represents an Single Single Assignment (SSA) statement related to the computation of the value of the parameter at the source/sink. We then perform a post-order DFS traversal and constify each node using abstract interpretation of the SSA statements. Note that the post-order traversal of the sub-DDG guarantees that before trying to constify a certain node, we will have already visited and constified all its predecessors (DDGs are directed graphs). The initial seeds to this process are SSA statements that correspond to leaf nodes in the sub-DDG graph and contain constants of primitive types, like strings, URIs, numerical values, etc. Finally, once we have collected a set of possible constants for the respective parameter(s), we check every constant separately to see if it matches the value that indicates this is a source/sink.

We identify the conditional sources/sinks that depends on their parameter values. Here, we present another kind of conditional sources/sinks whose conditions are the types of the objects they belongs to. Let us see the 36 th line of the source code in the example, the object output of generic type OutputStream can write data to either a local file or remote server based on its channel. However, data-flow analysis itself can only reflect that the output is an object of OutputStream. Without the knowledge of the concrete channel output is pointing to, we cannot figure out where it will write data to, and thus fail to determine whether output.write( ) is a sensitive sink. To tackle this issue, we propose object origin inference to infer the "derived type" of the interested object. Having the background with sub-graph in constant evaluation, our origin inference approach is actually intuitive. Considering the same example, we first select the node of output in the SDG as a root node, and build the its sub-DDG using backward slicing. Different from constant evaluation, we now perform pre-order BFS traversal to find the closest node for constructing the object. We collected the API signatures of the constructors of all possible derived types. Once encountering any constructor node (e.g., HttpsURLConnection.getOutputStream( ) in the given example) in the sub-DDG, we terminate the traversal and gain the type information from the constructor node. Given the type information, we can confidently identify the sensitive source/sink confidently. In the given example, as the output is a OutputStream object for HttpsURLConnection, we identify it as a sensitive sink. Similarly, we need to augment such conditional sources/sinks with sensitive type information.

In AAPL, the privacy disclosure detection problem is converted to the equivalent problem of checking for data-flows between sources and sinks. Naturally, the identification of sources/sinks becomes the prerequisite. Let us consider the example shown in the source code lines from 17 to 26 in the example, in which, the sensitive data rawName (a contact name) is first temporarily stored in the local file, and then loaded again to newName that is finally sent out to the remote server. From the perspective of privacy disclosure analysis, it can successfully identify cur.getString( ) as a source and output.write( ) in sendDataToServer( ) as a sink, and then check whether there is a flow between them. It turns out that the flow cannot be identified due to: 1) rawFile was not identified as a sensitive sink and newFile was not identified as a sensitive source; 2) the flow between rawFile and newFile is implicitly connected outside of app code, thus not identified. However, the sensitive data rawName is indeed sent to the remote server, as there is a joint flow from rawFile to output.write( ). We propose using joint flow tracking to handle such issues. Unlike the mechanisms in opportunistic constant evaluation and fine-grained propagation policy, joint flow tracking records all potential sources/sinks even they point to non-sensitive resources/channels, and finds all sub-flows contain potential sources or potential sinks by iteratively matching all potential sinks with all potential sources, we can join sub-flows together to complete privacy disclosure flows (if they exist). In the given example, even rawFile is pointing to a non-sensitive local file, it is first recorded as a potential sink. Accordingly, newFile is recorded as a potential source. The sub-flow from rawName to rawFile and sub-flow from newFile to output.write( ) will be joined together to form a sensitive privacy disclosure flow.

Our study shows most privacy disclosures are actually necessary to apps' core functionalities. Simply reporting all privacy disclosures to end users provides limited help, and the burden of consuming all privacy disclosures is extremely heavy. It is pressing to propose an automatic approach to differentiate the privacy leaks from legitimate privacy disclosures. We observed that identifying uncommon data-flows (i.e., suspicious privacy disclosure flows) among peer apps with similar functionalities is an effective way to differentiate privacy leaks from legitimate privacy disclosures. We detail how we collect the peer apps for each primary app and leverage peer voting mechanism to find the privacy disclosure flows which are likely to cause privacy leak flows.

Peer apps are defined from the perspective of users, which comprises the apps that are functionally similar to the primary app. In other words, the peer app could be an alternative app of the primary app to the users. AAPL aims to detect the privacy leaks of a given primary app via peer voting mechanism. Naturally, given the primary app, the first step is to derive its peer apps. There are several options to do this. For examples, we can simply use keyword-based search to collect peer apps, make use of machine learning techniques to classify apps based on some features, e.g., category, description, permissions, and called APIs, or leverage Google Play recommendation system.

To evaluate the quality of keyword-based peer apps, we took the name of the primary app as the keyword to query Google Play, and manually verified the returned peer apps. Unfortunately, we found several obvious problems with this option: 1) If the given app is unpopular, the number of returned "peer apps" is usually very small, e.g., less than 2, which is not enough for peer voting; 2) any app containing the keyword may appear in the returned apps list. For example, taking Facebook as a keyword, a game app Space Dog+ Facebook Game is in the returned list, which is obviously not functionally similar to Facebook. Due to these fundamental issues with the keyword-based approach, we turn to think about the machine learning approach to collect peer apps. However, features, such as permission and API are not suitable since they would bias the peer apps to likely have similar privacy disclosures, defeating our original purpose of discovering uncommon privacy leaks.

Finally, we decide to adopt the existing Google Play recommendation system, which can provide a Similar Apps list (also called Users Also Viewed before), and a Users Also Installed list for each app. These two lists are derived from the users' experience. Google takes the user view and installation patterns and leverages on data mining to derive such two lists to help users find alternative apps. Even though the detail techniques behind the recommendation is a black box, these two lists indeed provide users meaningful choices in terms of selecting functionally similar apps.

It is possible these two lists may contain some noisy apps and polluting apps. Generally, there are mainly two kinds of noisy apps, accessory apps and the "most popular" apps. This issue is reasonable that users who viewed/installed an app may also view/install its accessory app, e.g., skin or photo downloading app, and the most popular apps, e.g., browser app. Though providing accessory apps and "most popular" apps is a necessary feature for a recommendation system, AAPL prefers purer peer apps to produce more accurate results. Therefore, we seek for some way to filer out noisy apps. For "most popular" apps, the simple same-category policy can remove most of them, i.e., only apps having same category as the primary app are selected as peer apps. To filter out other noisy apps, we observed NLP can help provide a ranking of similar apps based on the description semantic similarity [30] between them and primary app. For example, the description of facebook skin app only mentions its changing color functionality but none of facebook's core functionalities, e.g., sharing photos and videos with friends, posts, text, chat and games. Such apps will be naturally put in a low ranking by NLP. With this intuition, we apply NLP on the similar app lists provided by Google Play, and rank them based on their semantic similarity with primary app. The apps with low ranking will be excluded for peer apps.

Similar apps, recommended by Google Play, which are published by the same publisher as primary app, are defined as polluting apps. In our evaluation, we indeed find many such cases that the developers release multiple "almost the same" apps, which will dramatically affect the fairness of peer voting 3.2.2 and result in false negative. To eliminate such polluting apps, we take the developer account into consideration, to make sure that the developer of every peer app is different from the one of the primary app.

It is true that the above filtering is not completely reliable. Fortunately, the peer voting mechanism does not require a perfect peer app list. With the quality of current peer apps selection approach, we have already achieved a good accuracy. Note that the peer voting mechanism is not binded to a specific peer app selection algorithm. If one can provide a better approach to produce peer app lists in the future, the final detection accuracy of AAPL will be further improved.

After we have the privacy disclosures of primary app and its peer apps, peer voting mechanism becomes intuitive. Given a particular privacy disclosure in each primary app, every (its) peer app has a chance to vote for it: every peer app needs to answer the question: Do I have this privacy disclosure? If yes, the peer votes for 1; otherwise, vote for 0. The total number of votes with 1 is represented as VotesNumber; while the number of peer apps for the primary app of the given privacy disclosure is represented as PeersNumber. Now, we can easily derive a new number, namely privacy discreteness, which is calculated with the following formula:

$$|privacy discreteness| = |VotesNumber/PeersNumber| \quad (1)$$

privacy discreteness represents "how likely the privacy disclosure is legitimate in the primary app".

Next, we detail our end-to-end implementation of the complete suspicious privacy disclosure flow detection system, including the privacy disclosure analysis module and the peer voting mechanism.

Our privacy disclosure flow analysis module is built on top of IBM WALA. It takes as input an off-the-shelf apk file, and translates its Dalvik bytecode into an intermediate representation (IR), relying on Dexlib, a popular and open-sourced Dalvik bytecode parser for Android apps. After that, static single assignment (SSA) conversion is performed to leverage various built-in basic analyzers of WALA, e.g., point-to analysis and the call graph building.

Given that existing works have implemented similar static program analysis systems based on WALA, we skip the basic implementation details, and only elaborate on our core contributions, which significantly improve the accuracy of privacy disclosure flow detection. These improvements account for about 6K SLoC in Java. In the following, we mainly focus on system dependency graph refinements conditional dataflow analysis. and post flow analysis.

We do not include the framework code in our analysis scope, but choose to model the framework functions. This design choice helps us avoid significant overhead and inaccuracy caused by the use of reflection and complexity in framework code; on the other hand, it misses the flow propagation details inside the framework functions. To address this issue, when building the SDG using WALA, we first employ a default coarse-grained data propagation policy (i.e., there are flows from parameters to return value, but not flows between parameters) for framework functions, and obtain a raw SDG. After that, we adopt manual modeling of commonly invoked framework functions at a fine granularity, and perform SDG refinement to insert or delete edges for the manually modelled framework functions.

An example of how we specify our fine-grained data propagation policy for a frequently used framework function is discussed next. More specifically, each propagationPolicy tag contains a set of flow propagation policies of a specific framework method. Within each propagationPolicy tag, we could specify multiple data-flows between the parameters, return value, and the object instance. To make the coverage of fine-grained propagation policy as complete as possible, we collect all framework functions used in the app set used in evaluation 5.2, and rank them based on their occurrences descendingly. We specify fine-grained policies as long as a framework function has 1) a flow from its parameter to parameter; or 2) no flow from any parameter to return value.

To accommodate the programming paradigm of Android, our primary goal is to accurately determine whether the conditional sources/sinks are indeed sensitive ones. We implemented the opportunistic constant evaluation and object origin inference components to support conditional source/sink as a back end analyzer.

For opportunistic constant evaluation, we first construct the sub-DDG for a statement in question (e.g., for a generic data wrapper like ContentProvider.query( ). Next, we traverse the sub-DDG using the technique outlined above. We extended the basic WALA statement node representation with additional fields for keeping sets of constant values. While performing the post-order DFS traversal each node is "constified" by considering the SSA instruction of the node, along with the constant sets of the predecessor nodes (i.e., typically instruction operands). Essentially, the opportunistic constant evaluation process is also guided by our manually specified "folding" policies (e.g., we perform string concat for StringBuilder.append( )), including special handling for all ALU instructions (i.e., ADD, AND, XOR, SHL, NEG, etc.), as well as domain knowledge for all methods of primitive Java classes, such as String, StringBuilder, Uri, Integer, Float, Boolean, etc.).

The implementation of object origin inference is similar, while it leverages the pre-order BFS traversal to find the closest constructor or assigner (i.e., the origin) that can reflect the type information of the object in question (e.g., output in 35 th line in example code). Armed with the type information of the object, we can safely decide the sensitivities of the respective conditional sources/sinks.

The discovered privacy disclosure flows may contain false positive ones that are mainly from data propagation. See the common example shown in lines 6 and 9 in example code. cur is identified as a sensitive source, as uri points to contacts. And then contactsCounter derived from cur is sent to the remote server. This flow would be detected as a privacy disclosure, however, the value of contactsCounter is non-sensitive, which results in a false positive privacy disclosure. In order to reduce false positive, we have adopted a heuristic-based post flow analysis model to filter out different kinds of false positive flows: 1) only the non-sensitive metadata is disclosed, e.g., only contactsCounter in above example is sent out. 2) sensitive data is processed by sensitivity-eliminating functions, e.g., a hash function; 3) The sensitive data that is normally disclosed to particular sinks, e.g., cookie is normally disclosed to remote server, should not be taken as a privacy leak. Note that, our heuristic-based may increase false negatives, and hard to be complete. AAPL indeed achieved a good accuracy, in terms of a low false positive rate and a good detection rate.

To implement the peer voting mechanism, we first implement the noisy peer app filtering approach described earlier.

Leveraging NLP to rank peer apps is the main component in the poisy peer app filtering process. There are about 5% apps with non-english description, we skip them and leave the peer app list unchanged. More specifically, we adopt NLTK, a popular and easy-to-use Natural Language Toolkit for python program. Given descriptions of two apps, we preprocess them by lowercasing the texts and removing the punctuations inside them. Then we tokenize the description texts and remove English stop words (e.g., 'this', 'is', 'a', etc.). After that, we change the tokens into tf-idf vectors. With tf-idf vectors for the given two apps, we can easily compute the cosine similarity between them, which represents how similar the two descriptions are. In this way, we get similarities between each peer app and it primary app, based on which, we have a ranked list of peer apps. Note that we need to further set a threshold of similarity to determine which ones are to be excluded.

With the purified peer apps, we apply the privacy disclosure analysis on the primary app and their peer apps, and collect privacy disclosure flow results. Then, we conduct peer voting by counting the number of how many peer apps have the same privacy disclosure as the primary app. Finally, we derive the privacy discreteness of each privacy disclosure in primary app by dividing the count by the number of peer apps.

The system uses conditional flow identification through opportunistic constant evaluation and object origin inference, and joint flow tracking Results show that the enhancements increase the detection rate by % while reducing the false positive rate by times. The system using a novel peer voting mechanism to automatically differentiate the security-critical privacy leaks from the more general legitimate privacy disclosures.

The results show AAPL has a high accuracy and high performance. We perform our experiments on a cluster of three servers, each equipped with a Xeon E5-1650 processor and 64 GB of memory. These servers are inter-linked with a 1 Gbps Ethernet network link. With this setup, we are able to execute static analyses for apps in parallel.

We collect a set of primary apps by running our privacy disclosure analysis on the most popular apps set from the Google Play market, and discover apps that have privacy disclosure flows that may lead to privacy leaks. We then leverage the app market's recommendation system to derive the (refined) peer apps for each primary app. We again perform privacy disclosure analysis on the entire set of peer apps. Finally, we apply the analysis results in the peer voting mechanism to deduce the primary apps with potential of privacy leaks.

We evaluate the accuracy of both the privacy disclosure analysis and the peer voting mechanism using manual efforts. Due to the large quantity of results, we randomly select a subset of the results and investigate their correctness. For disclosure analysis, we perform disassembly and decompilation on the discovered disclosure code paths and examine their validity. For the peer voting mechanism, we present each primary app and its disclosure to domain experts, who have been working on Android disclosure detection more than two years. They rate the legitimacy of the disclosure based on the following procedures:

1. Collect app semantics by reading app description, "What's New", screen-shots, and user reviews, and by installing and running the app;
2. Identify the functionalities the app potentially has;
3. Try to map the disclosures to the identified functionality—the successfully mapped disclosures are flagged legitimate.
4. Those disclosures could not map to any identified functionality are then flagged as privacy leaks with potential of privacy violations.

Leveraging AAPL's capability of privacy disclosure discovery, we extent the idea of peer app comparison to another scenario—evaluating the privacy disclosure between official and unofficial apps. We define an unofficial app as an app from alternative Android markets with the same name, icon, and advertised functionalities as the corresponding app from Google Play, but differ in digital signature. In other words, unofficial apps are tempered copies of their official counterparts. To a normal user, unofficial apps appear indistinguishable from the official ones; however, because the alternative markets usually lack quality control and security assurance, unofficial apps are more likely to abuse users' privacy.

We download the top 150 free apps from Google Play, and their unofficial counterparts from Wandoujia, one of largest third-party mobile app distribution platforms, which collects apps from different major third-party Android markets. We first process all apps using AAPL and uncover each app's privacy disclosures. We find that while most unofficial apps have identical privacy disclosures to their respective official apps, there are unofficial apps exhibit different privacy disclosures. We manually analyze these unofficial apps and discover that apps have more privacy disclosures, and apps have less privacy disclosures than their corresponding official apps, respectively.

Among the apps with more privacy disclosures, we find three reasons for the increased leakage: 1) Modified control flow: the unofficial apps have modified components with potentially malicious code injected, which introduced more privacy leaks. 2) Replaced library: the unofficial apps have bundled different ad libraries, which contain more privacy leaks. 3) Cross component privacy leak: some additional privacy disclosures are found with source inside the app's own component but sink inside the ad library, and vice versa. We think this finding is quite interesting, and it may represent a new kind of leak, where the ad library may be exploited in participating in privacy leaks.

Among the apps with less privacy disclosures, we find two reasons for the reduced leakage: 1) Earlier versions: the unofficial apps are modified based on earlier versions of the official ones, which had less privacy leaks. 2) Replaced library: the unofficial apps have bundled different ad libraries, which contain less privacy leaks.

In sum, the AAPL system detects real privacy leaks in Android apps that negatively impact end-users. AAPL conducts specialized static analysis and achieves significant improvements over previous work in terms of coverage, efficiency, and accuracy. By comparing detected privacy disclosures in primary apps with those of the peers, AAPL effectively rules out the common and legitimate disclosures, exposing only those privacy leaks that cannot be associated with apps' functionalities. The results shows that, our peer voting-based approach can successfully remove the overwhelming noise (i.e., false alerts on legitimate disclosures) from which most similar detection systems suffer. The evaluation demonstrates that AAPL scores a high accuracy of % with a % false positive rate and a % false negative rate, at a high throughput (4.5 apps per minutes on a three-machine cluster). As a result, AAPL can greatly increase the detection rate of threatening privacy leaks, and at the same time, considerably reduce the manually efforts required from security analysts or end-users.

What is claimed is:
1. A method for protecting privacy in an application software (target app), comprising:

using a particular machine, receiving the target app and identifying a list of functionally similar apps to the received target app based on recommendations from at least one market provider;

filtering the list by both a same-category policy and semantic similarity;

performing a static privacy disclosure analysis to detect privacy disclosures in the target app and privacy disclosures in each of the similar peer apps in the filtered list by detecting, in each app, data-flows from predefined sensitive data (sources) to predefined channels (sinks) and modeling the privacy disclosures by specific data-flows connecting the sources to the sinks;

responsive to the performing, determining the most common sets of source and sink pairs from the similar peer apps in the filtered list; and reporting a variance between the target app source and sink pairs and the determined most common sets of source and sink pairs.

2. The method of claim 1, wherein the performing further comprises static taint analysis of the target app and comparing it with a static taint analysis of each of the similar peer apps in the filtered list.

3. The method of claim 1, further comprising performing opportunistic constant evaluation with folding.

4. The method of claim 3, further comprising statically computing a set of all possible values of specific parameters along all program paths passed to conditional sources/sinks, and determining sensitivity of the conditional sources/sinks based on the set.

5. The method of claim 1, further comprising determining a data-dependence sub-graph of the source and sink pairs as a directed graph (DDG) rooted with at least one conditional parameter of the respective source and sink pairs, wherein each node of the DDG represents a Static Single Assignment (SSA) statement related to a value of a parameter at the source and sink pair; performing a post-order Depth First Search traversal; and constify each node using abstract interpretation of the SSA statements.

6. The method of claim 1, wherein filtering by semantic similarity further comprises applying natural language processing to the identified functionally similar peer apps by tokenizing description texts and changing the tokenized description texts into term frequency-inverse document frequency (tf-idf) vectors; and determining cosine similarity of the tf-idf vectors for the identified functionally similar peer apps to arrive at a ranked list of peer apps.

7. The method of claim 1, further comprising translating an off-the-shelf apk file bytecode into an intermediate representation and performing a static single assignment conversion for point-to analysis and call graph building.

8. The method of claim 1, further comprising given a particular privacy disclosure in the target app, every similar peer app in the filtered list has a chance to indicate if it has the same privacy disclosure as the target primary app; wherein a total number of affirmative votes is represented as VotesNumber; while the number of similar peer apps in the filtered list for the target app of the given privacy disclosure is represented as PeersNumber.

9. The method of claim 8, further comprising deriving privacy discreteness representing the likely legitimacy of the privacy disclosure of the target app as |privacydiscreteness|=|VotesNumber/PeersNumber|.

10. The method of claim 1, further comprising performing opportunistic constant evaluation and object origin inference to support conditional source/sink as a back end analyzer.

* * * * *